United States Patent
Yoshii

(10) Patent No.: US 9,053,546 B2
(45) Date of Patent: Jun. 9, 2015

(54) INFORMATION PROCESSING APPARATUS, CONTROL METHOD THEREFOR, AND COMPUTER-READABLE STORAGE MEDIUM

(75) Inventor: Hiroto Yoshii, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 970 days.

(21) Appl. No.: 13/165,917

(22) Filed: Jun. 22, 2011

(65) Prior Publication Data
US 2012/0008830 A1    Jan. 12, 2012

(30) Foreign Application Priority Data

Jul. 12, 2010 (JP) .................. 2010-158263

(51) Int. Cl.
*G06K 9/00* (2006.01)
*G06T 7/00* (2006.01)

(52) U.S. Cl.
CPC ..... *G06T 7/0044* (2013.01); *G06T 2207/20081* (2013.01)

(58) Field of Classification Search
CPC ....................................................... G06K 9/00
USPC ....................................................... 382/103
See application file for complete search history.

(56) References Cited

U.S. PATENT DOCUMENTS

| | | | |
|---|---|---|---|
| 2009/0256858 A1* | 10/2009 | Ogikubo et al. | 345/620 |
| 2010/0303337 A1* | 12/2010 | Wallack et al. | 382/154 |
| 2011/0103652 A1* | 5/2011 | Saruta et al. | 382/106 |

FOREIGN PATENT DOCUMENTS

| | | |
|---|---|---|
| JP | 08-153198 A | 6/1996 |
| JP | 2003-022442 A | 1/2003 |
| JP | 2003271928 A | 9/2003 |
| JP | 2010146303 A | 7/2010 |

OTHER PUBLICATIONS

N. Dalai et al., "Histograms of Oriented Gradients for Human Detection", Proc. of IEEE Conference on Computer Vision and Pattern Recognition (CVPR), pp. 886-893, 2005.
D.G. Lowe, "Object Recognition from Local Scale-Invariant Features", Proc. of IEEE International Conference on Computer Vision (ICCV), pp. 1150-1157, 1999.

* cited by examiner

*Primary Examiner* — Stephen R Koziol
*Assistant Examiner* — Delomia Gilliard
(74) *Attorney, Agent, or Firm* — Fitzpatrick, Cella, Harper & Scinto

(57) ABSTRACT

An information processing apparatus for estimating a position and orientation of a target object in a three-dimensional space, inputs a plurality of captured images obtained by imaging the target object from a plurality of viewpoints, clips, for each of the input captured images, a partial image corresponding to a region occupied by a predetermined partial space in the three-dimensional space, from the captured image, extracts, from a plurality of partial images clipped from the plurality of captured images, feature information indicating a feature of the plurality of partial images, stores dictionary information indicating a position and orientation of an object in association with feature information of the object corresponding to the position and orientation, and estimates the position and orientation of the target object by comparing the feature information of the extracted target object and the feature information indicated in the dictionary information.

12 Claims, 8 Drawing Sheets

INFORMATION PROCESSING APPARATUS, CONTROL METHOD THEREFOR, AND COMPUTER-READABLE STORAGE MEDIUM

BACKGROUND OF THE INVENTION

1. Field of the Invention

The present invention relates to an information processing apparatus, a control method therefor, and a computer-readable storage medium, and in particular relates to technology for estimating the position and orientation of a target object in a three-dimensional space.

2. Description of the Related Art

The following are known to be two main techniques for estimating the position and orientation of an object in a three-dimensional space (three-dimensional measurement). One is stereo vision that employs a triangulation method, and the other is a technique of performing pattern matching with a registered image in which the position and orientation are known.

In the case of stereo vision, there is known to be a technique that uses two cameras and a technique using one camera and a laser beam. In both of these techniques, the three-dimensional position of an observation point is obtained based on a triangulation method performed using one point that is observed and two points from which observation is performed. With the technique using two cameras, it is difficult to specify corresponding observation points in the images captured by the cameras, and there is a high possibility of errors occurring. This is known as the problem of finding corresponding points in stereo vision. In contrast, it is simple to find corresponding points in the technique using a laser beam, but it is difficult to accurately control the laser beam, thus leading to errors.

Whereas stereo vision requires two cameras, or one camera and a laser beam irradiation apparatus, the technique using pattern matching basically requires only one camera. With this technique, images of objects in which the three-dimensional position and orientation are known in advance are stored, and when an image is newly input, the position and orientation of the target object are obtained by performing matching between the new image and the stored images.

As one example of this technique using pattern matching, there is known to be a configuration in which a parametric eigenspace method is used to perform orientation estimation using a small number of registered images (Japanese Patent Laid-Open No. 8-153198).

There is also known to be a technique of specifying the position of an object with higher accuracy by performing pattern matching using two or more cameras (Japanese Patent Laid-Open No. 2003-22442). In the technique disclosed in Japanese Patent Laid-Open No. 2003-22442, the panning, tilting, and zooming of multiple cameras are sequentially controlled. Specifically, the detected position of the object in the image captured immediately previously by a camera is used to successively determine the panning, tilting, and zooming so as to enable detection of the same object with the camera that is to perform image capturing next. A position is considered to be correct if the object has been detected with two or more cameras, and the position of the object is determined so as to minimize the error between the positions detected by each camera.

The aforementioned problem of finding corresponding points becomes a fundamental problem arises when two cameras are used in the stereo vision described above problem. In particular, in stereo vision, corresponding points need to be visible from the two cameras, and if an observation point is not visible from either of the cameras due to self-occlusion of the target object, it is impossible in principle to perform three-dimensional measurement.

The technique disclosed in Japanese Patent Laid-Open No. 2003-22442 also requires corresponding points to be visible from two cameras, and this technique can be said to be a technique in which, if an observation point is visible from only one of the cameras due to self-occlusion of the target object, a technique of estimating the position and orientation of the object using pattern matching with one camera is simply extended to multiple cameras. In other words, images captured by multiple cameras are used individually in pattern matching. Accordingly, there is a limit to the accuracy in estimation of the position and orientation of the object. Also, in the case where contradicting position and orientation estimation results are obtained by multiple cameras, there is the problem that resolving such a contradiction is difficult.

SUMMARY OF THE INVENTION

The present invention has been achieved in light of the above-described issues and aims to provide technology to stably and highly accurately estimating the position and orientation of a target object in a three-dimensional space using multiple captured images, even in an environment in which self-occlusion occurs.

According to one aspect of the present invention, an information processing apparatus for estimating a position and orientation of a target object in a three-dimensional space, includes: an input unit adapted to input a plurality of captured images obtained by imaging the target object from a plurality of viewpoints; a clipping unit adapted to, for each of the input captured images, clip a partial image corresponding to a region occupied by a predetermined partial space in the three-dimensional space, from the captured image; an extraction unit adapted to extract, from a plurality of partial images clipped from the plurality of captured images, feature information indicating a feature of the plurality of partial images; a storage unit adapted to store dictionary information indicating a position and orientation of an object in association with feature information of the object corresponding to the position and orientation; and an estimation unit adapted to estimate the position and orientation of the target object by comparing the feature information of the target object extracted by the extraction unit and the feature information indicated in the dictionary information.

According to another aspect of the present invention, a method for controlling an information processing apparatus that comprises a storage unit adapted to store dictionary information indicating a position and orientation of an object in association with feature information of the object corresponding to the position and orientation, and that is for estimating a position and orientation of a target object in a three-dimensional space, the method includes the steps of: inputting a plurality of captured images obtained by imaging the target object from a plurality of viewpoints; clipping, for each of the input captured images, a partial image corresponding to a region occupied by a predetermined partial space in the three-dimensional space, from the captured image; extracting, from a plurality of partial images clipped from the plurality of captured images, feature information indicating a feature of the plurality of partial images; and estimating the position and orientation of the target object by comparing the feature information of the target object extracted in the extraction step and the feature information indicated in the dictionary information.

Further features of the present invention will become apparent from the following description of exemplary embodiments with reference to the attached drawings.

DESCRIPTION OF THE EMBODIMENTS

Below is a detailed description of embodiments of the present invention with reference to the accompanying drawings.

In the present embodiment, a configuration for estimating the position and orientation of a target object in a three-dimensional space is described.

Basic Processing Procedure

Figure 1:
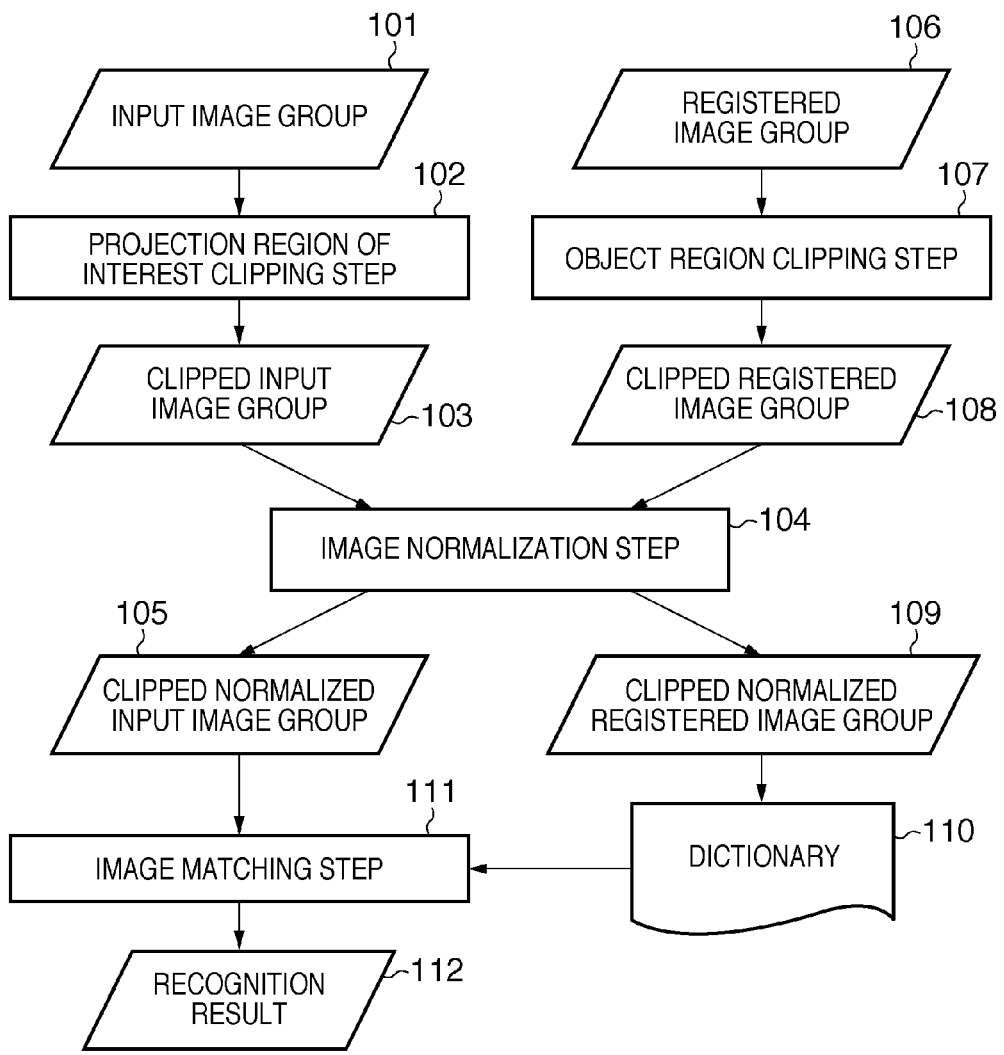
FIG. 1 is a processing flowchart illustrating a basic processing procedure of an object recognition technique.
Figure 3:
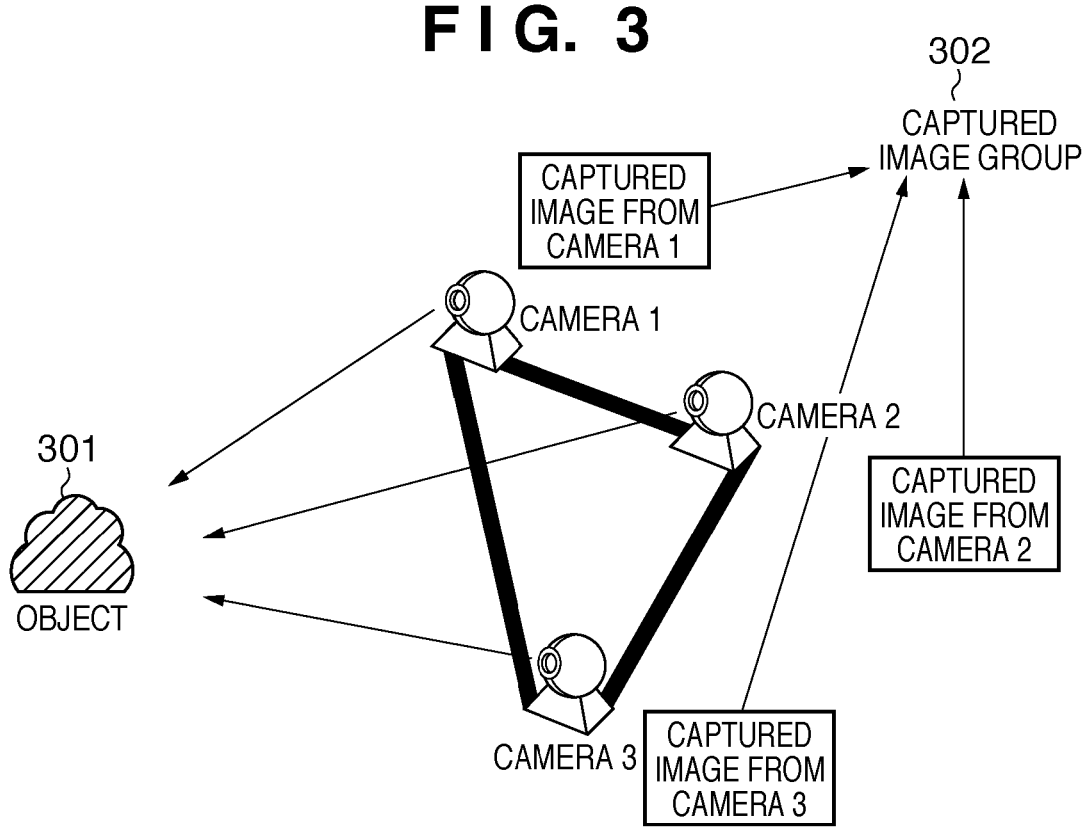
FIG. 3 is a diagram showing how images of a target object are captured by multiple cameras.

FIG. 1 is a processing flowchart illustrating a basic processing procedure of an object recognition technique according to the present embodiment. Reference numeral 101 denotes an input image group (input captured image group), which is made up of multiple images captured by, for example, multiple cameras (imaging apparatuses) imaging the same object from mutually different viewpoints as shown in FIG. 3. Note that it is assumed in the present embodiment that 101 denotes an image group made up of multiple images captured by multiple cameras. However, an image group obtained by capturing multiple images from different viewpoints with a single camera as described later may also be used.

Reference numeral 102 denotes a projection region of interest clipping step in which a projection region of interest is clipped from the images in the input image group 101. Details of this processing will be described later with reference to FIGS. 4A to 4C. Then, an input image group (clipped input image group) 103 obtained by the clipping is subjected to size normalization in an image normalization step 104, thus creating a clipped normalized input image group 105.

Meanwhile, a registered image group (registered captured image group) 106 made up of images captured in advance is subjected to processing in an object region clipping step 107, thus creating a clipped registered image group 108. Likewise to the input image group 101, the registered image group 106 is made up of multiple images captured by, for example, multiple cameras as shown in FIG. 3. Also, the number of captured images for one object (in the case of FIG. 3, the number of cameras) is assumed to be the same in the input image group 101 and the registered image group 106. Furthermore, although described later in detail with reference to FIG. 3, the three-dimensional relationships in the captured images, that is to say, the camera positions and the imaging directions used when acquiring the captured images, is assumed to be basically the same in the input image group 101 and the registered image group 106. In other words, the camera position and the imaging direction are constant when capturing the registered images and the input images. The position and orientation of the object are known when creating the registered image group 106. This means that the region that the target object existence range occupies in the captured images is also known. Accordingly, in the processing of the object region clipping step 107, a partial image is clipped using a later-described detection frame (partial space) encompassing the target object.

Note that although the registered image group 106 in the processing flowchart of FIG. 1 is assumed to be obtained by actually imaging the target object, a set of pseudo target object images obtained using highly accurate computer graphics may be used instead of the registered image group. Also, a configuration is possible in which images are captured from multiple limited directions, captured images are generated from an intermediate direction with respect to the limited directions, and the generated captured images are used instead of the registered image group.

The registered image group (also referred to as the "clipped registered image group") 108 obtained by the clipping in step 107 is normalized through the same processing (104) as the input image group, thus obtaining a clipped normalized registered image group 109 (clipped normalized registered captured image group).

Clipped normalized registered image groups 109 are created from registered image groups 106, in which various types of target objects have been imaged at various positions and orientations, and a dictionary (dictionary information) 110 is created by performing learning using the clipped normalized registered image groups 109. The dictionary 110 stores the information of captured images of target objects from multiple viewpoints, as well as information such as the types and the positions and orientations of the target objects. Note that the processing for generating the clipped normalized registered image groups 109 by executing the object region clipping step 107 and the image normalization step 104 on the registered image groups 106 and registering the clipped normalized registered image groups 109 in the dictionary 110 is performed prior to performing input image recognition. The dictionary information, which indicates the positions and orientations of objects in association with feature information of the objects at the corresponding positions and orientations as described above, is stored in an external storage apparatus 201 serving as a storage unit, as will be described later.

In an image matching step 111, matching is performed on the clipped normalized input image group 105 (clipped normalized input captured image group) using the dictionary 110, and a recognition result 112 is ultimately obtained.

The image matching step 111 may be realized by performing simple checking between images, or may be realized using machine learning technology. Note that in the case of performing simple checking between images in the image matching step 111, multiple sets of clipped normalized registered image groups are simply registered in the dictionary 110.

It is important in the image matching step 111 that the information of multiple images is handled collectively as one piece of information. In the case of performing simple checking between images, multiple captured images are simply concatenated, and the one concatenated input image is checked against multiple registered images. In the case of using machine learning technology, features may be extracted from each image, and the multiple feature amount vectors obtained as a result may be simply connected to create a single feature vector (feature information). Alternatively, a composite feature amount may be extracted from multiple images and used to create a single feature vector. Any algorithm may be used in the machine learning, examples of which include a neural network, a support vector machine, a nearest neighbor matching algorithm, and a classification tree.

Configuration of Information Processing Apparatus

Figure 2:
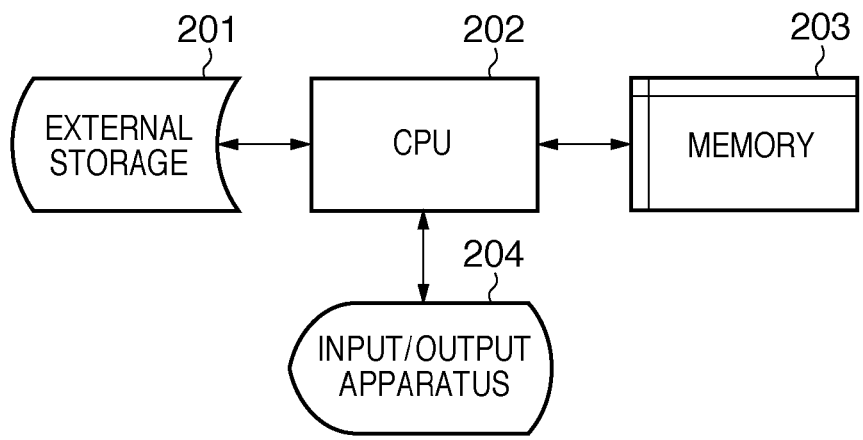
FIG. 2 is a block diagram showing the configuration of an information processing apparatus.

FIG. 2 is a block diagram showing the configuration of an information processing apparatus that executes the object recognition technique according to the present embodiment. As shown in FIG. 2, the information processing apparatus includes the external storage apparatus 201, a central processing unit (CPU) 202, a memory 203, and an input/output apparatus 204.

The external storage apparatus 201 serving as the storage unit stores and holds, for example, programs for realizing the present embodiment, registered images captured by cameras, and a dictionary created using the registered images. The external storage apparatus 201 also has a function for holding target object recognition results obtained by the configuration of the present embodiment.

The central processing unit 202 executes a program realizing the object recognition technique and controls other apparatuses included in the information processing apparatus. The memory 203 temporarily stores and holds subroutines, data, and programs used by the central processing unit 202. The input/output apparatus 204 retrieves images from cameras, interacts with a user, and outputs object recognition results to other information processing apparatuses. There are also cases where the execution of the program realizing the object recognition technique of the present embodiment is triggered by the user via the input/output apparatus 204. Furthermore, there are cases where the user checks results and controls program parameters via the input/output apparatus. It is also possible for there to be cases where the output destination is an apparatus that controls a robot.

Camera

FIG. 3 is a diagram showing how images of a target object are captured by multiple cameras (imaging apparatuses) in the present embodiment. In the present embodiment, multiple captured images captured from multiple imaging positions using multiple cameras are acquired and input to the information processing apparatus. FIG. 3 shows an example where images of an object are captured by three cameras. As shown in FIG. 3, there is a certain amount of distance separating a target object 301 and the cameras in the present embodiment. Specifically, the distance separating the target object and the cameras is set such that even if the target object moves in the depth direction, it can be considered that only the size of the shape of the target object imaged by each camera changes.

It is important in FIG. 3 that the position and orientation of each camera is known and fixed. Due to fixing the position and orientation of each camera, there is correlation between the three captured images (captured image group 302) obtained by imaging the target object at the same position and orientation. In the present embodiment, the position and orientation of the target object is detected with higher accuracy by effectively utilizing this correlation between images.

Projection Region of Interest Clipping

Figure 4A:
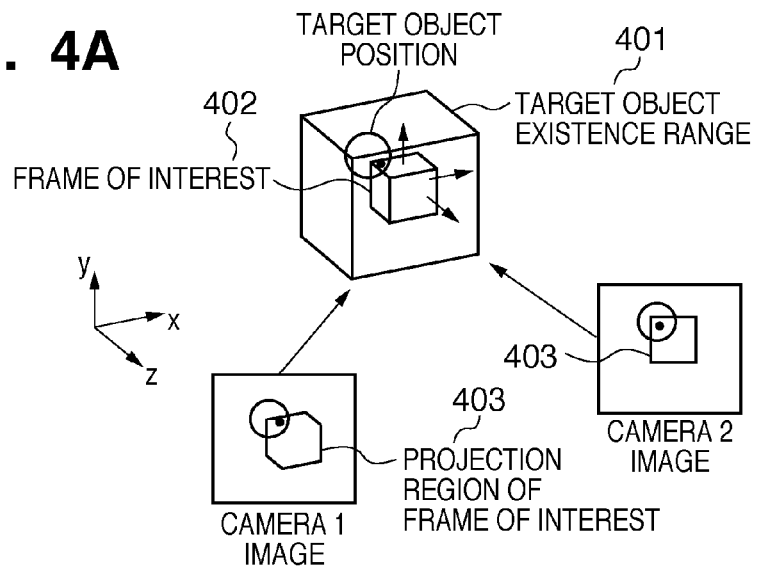
FIGS. 4A to 4C are diagrams showing relative positions of cameras and a target object in a three-dimensional space.
Figure 4B:
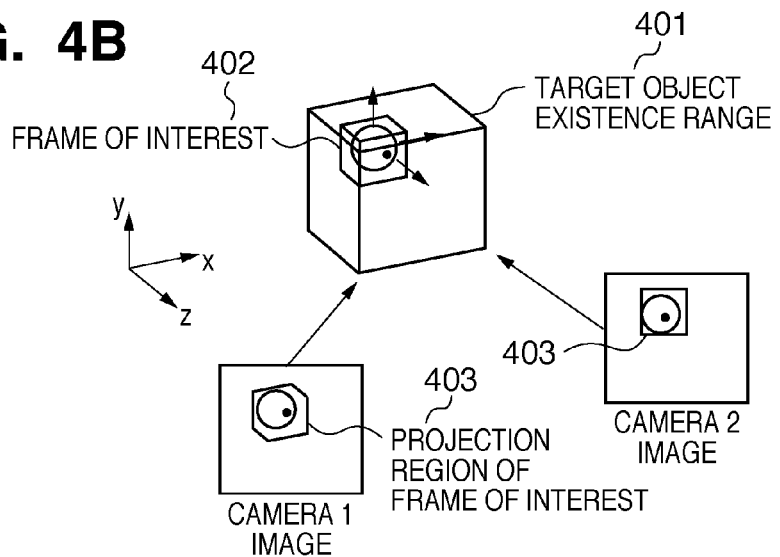
Figure 4C:
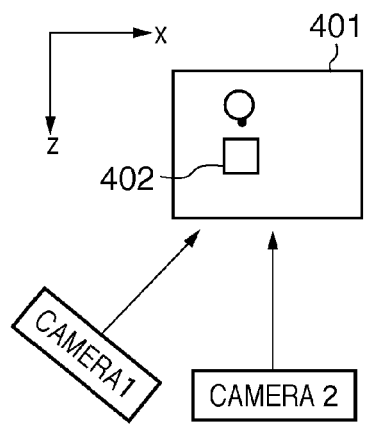

Next is a description of processing in the projection region of interest clipping step 102 with reference to FIGS. 4A to 4C. FIGS. 4A to 4C are diagrams showing relative positions of a target object and cameras in a three-dimensional space.

In FIGS. 4A to 4C, one target object and two cameras exist in an xyz coordinate space shown on the left side of the figures. Although the arrangement, positions, and orientations of the object and the cameras are the same in FIGS. 4A and 4B, the positions of the frame of interest are different. FIG. 4C is a diagram showing the space in FIG. 4A as viewed from above (the y axis positive direction). For easier understanding of its orientation, the target object has a structure in which a small black sphere is joined to a large white sphere.

In the present embodiment, the three-dimensional range of existence of the target object, in which object recognition is performed, has been given in advance. In FIGS. 4A to 4C, reference numeral 401 denotes the range in which the target object can exist. In the present embodiment, the position and the orientation of the target object in the existence range 401 are recognized and detected. Since the distance between the target object and the cameras is sufficiently large in the present embodiment, regardless of where the target object is located in the existence range 401, it can be considered that there is no change in the shape of the target object appearing in the cameras, with the exception of a change in size. Note that if target object moves within the existence range such that the distance between the target object and a camera decreases, it becomes impossible to ignore the fact that the appearance of the target object changes. Such a case will be described in detail later.

In FIGS. 4A to 4C, reference numeral 402 denotes the frame of interest (partial space), which is a virtual box in the existence range 401 of the target object. The size of the frame of interest 402 is set such that the target object can be covered (encompassed) no matter what direction it is facing.

As shown in FIGS. 4A and 4B, a frame of interest projection region 403 is the region in which the frame of interest 402 is projected in each of the cameras. In the processing of the projection region of interest clipping step 102, the frame of interest projection region 403 is clipped from the captured images while moving the frame of interest 402 in the xyz axis directions within the existence range 401 of the target object. For example, assume that the size of the existence range 401 of the target object is 10 cm, 20 cm, and 15 cm in the x axis direction, the y axis direction, and the z axis direction respectively, and assume that the frame of interest 402 is a cube with 5-cm edges. If the frame of interest is moved one centimeter at a time in the existence range of the target object, the projection region of interest clipping step 102 is executed 1,056 times (=6×16×11). In this way, in the clipping processing of the projection region of interest clipping step 102, a partial image corresponding to the region occupied by a predetermined partial space (detection frame) in the three-dimensional space is clipped from each of multiple captured images that have been input. In particular, in the present embodiment, partial images are successively clipped from captured images while moving the detection frame, thus realizing clipping processing for clipping partial images respectively corresponding to multiple partial spaces from multiple captured images.

FIG. 4A shows the case where the frame of interest 402 does not overlap the target object, and FIG. 4B shows the case where the frame of interest 402 completely overlaps (encompasses) the target object. Note that whereas only part of the target object is contained in the frame of interest projection region 403 in FIG. 4A, the entirety of the target object is contained in the frame of interest projection region 403 in FIG. 4B. Consequently, when the frame of interest 402 is moved to the position shown in FIG. 4B, the target object recognition result has the highest score, and the three-dimensional position of the target object can be specified.

In FIGS. 4A to 4C, it is most important that when the frame of interest completely overlaps the target object as shown in FIG. 4B, the two captured images in the frame of interest projection region 403 have a strong association. More specifically, the target object included in the captured image from a camera 1 is rotated relative to the target object included in the captured image from a camera 2 by the same angle as the angle formed by the imaging direction of the camera 1 and the imaging direction of the camera 2. In the examples shown in FIGS. 4A to 4C, in the case where the black sphere is located near the center of the large white sphere in the captured image obtained by the camera 2, the black sphere will be located at the bottom right of the white sphere in the captured image obtained by the camera 1. Then, in the case where the positions of the target object and the frame of interest match each other, that is to say, in the case where the frame of interest 402 completely encompasses the target object as shown in FIG. 4B, the target object projection region will be completely encompassed in the frame of interest projection region 403 of both the camera 1 and the camera 2. In the present embodiment, image matching is performed using the associations between these clipped image groups. Specifically, the information of multiple clipped image groups is combined to obtain a single image or a single vector.

Note that although the case has been described in which the existence range 401 of the target object and the frame of interest 402 are a rectangular parallelepiped and a cube in FIGS. 4A to 4C, the shapes of the existence range 401 and the frame of interest 402 are not limited to this. For example, they may be a sphere or an oval sphere. An irregular shape formed by combining a rectangular parallelepiped and an oval sphere may also be used. Also, in the case where the frame of interest 402 has a spherical shape, the frame of interest can be clipped in the present embodiment by merely designating the central position and the radius of the sphere. In other words, instead of an explicit frame such as the frame of interest being necessary, it is necessary and important to have information indicating what three-dimensional position is the position of interest.

Processing Flow

Figure 5:
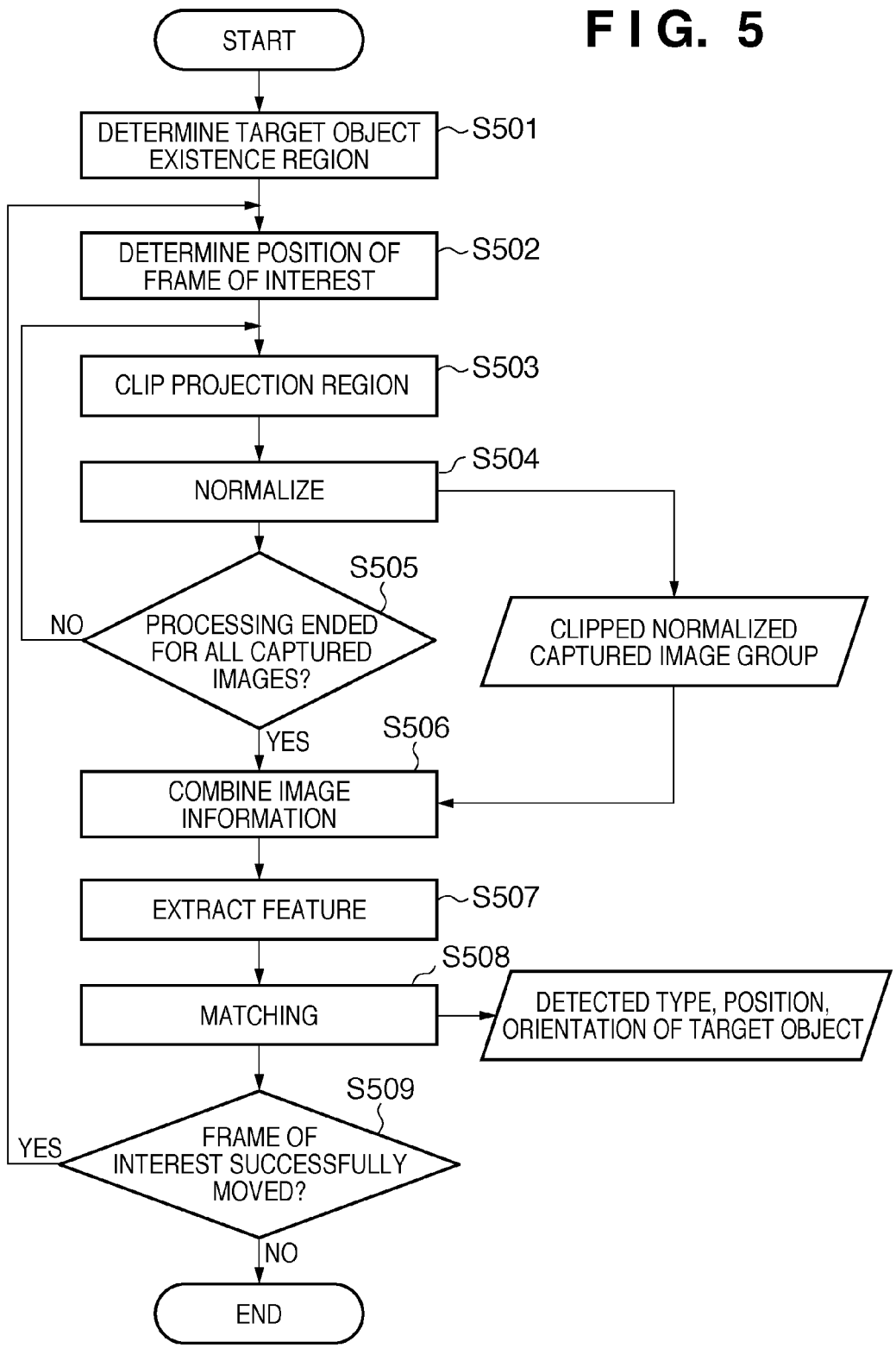
FIG. 5 is a flowchart showing a processing procedure executed by the information processing apparatus.

FIG. 5 is a flowchart showing a procedure of processing executed by the information processing apparatus in order to realize the processing described with reference to FIG. 1. The processing of the steps in this flowchart is executed under control of the central processing unit (CPU) 202 of the information processing apparatus.

Firstly, in S501 the region in which the target object exits (existence range 401) is determined. In the case where the existence region of the target object has a rectangular parallelepiped shape, the direction thereof is also determined. One example is that shown in FIGS. 4A to 4C.

Next, in S502 the initial position of the frame of interest 402 is determined. The initial position can be set as, for example, the position of a corner of the existence region of the target object (existence range 401).

Next, in S503 the loop for clipping and normalizing the captured image group is entered. Letting n be the number of captured images acquired using the frame of interest 402 at one place, the loop including S503, S504, and S505 is executed n times, thus creating n clipped and normalized images.

Specifically, in S503 clipping processing is performed for clipping, from the captured image targeted for processing, a partial image corresponding to the region occupied by a predetermined partial space (detection frame) in the three-dimensional space.

Next, in S504 processing for normalizing the clipped partial image is performed. In this processing, image conversion processing is performed in order to, for example, convert the clipped partial image into a rectangular image having a predetermined size, and convert the luminance, brightness, and the like into a predetermined scale.

In S505, a determination is made as to whether the processing of S503 and S504 has been executed on all of the captured images that have been input. If processing on all of the captured images has ended (YES in S505), the procedure advances to S506, and if processing on all of the captured images has not ended (NO in S505), the procedure returns to S503, and processing continues.

Next, in the extraction processing of S506 and S507, feature information indicating features of a set made up of the partial images respectively clipped from the captured images is extracted from the partial images. In the present embodiment, a single image is generated by combining multiple partial images, and information indicating features in the single image is extracted as the feature information.

Figure 10A:
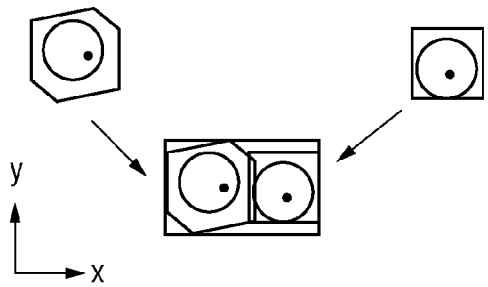
FIGS. 10A to 10C are diagrams showing examples of combining multiple images.
Figure 10C:
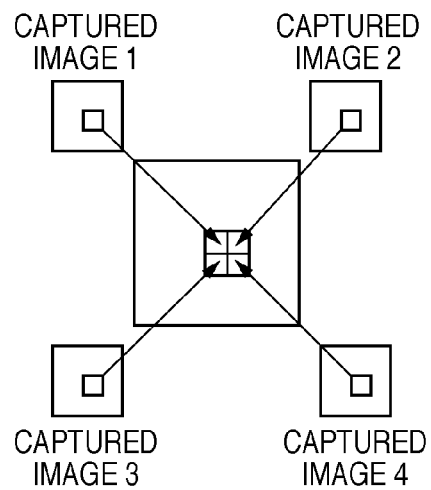
Figure 10B:
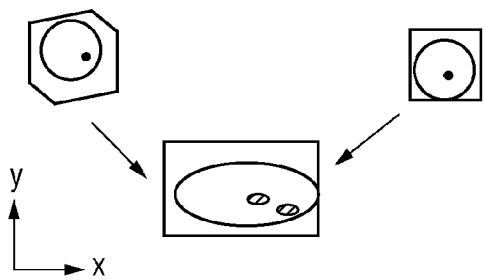

Firstly, in S506, the n clipped and normalized images are combined. An example of image combining will now be described with reference to FIGS. 10A to 10C. FIGS. 10A and 10B show examples of performing combining after normalizing clipped images from the camera 1 and the camera 2 in FIG. 4B.

The simplest method of combining involves creating one image by concatenating the n images. This corresponds to FIG. 10A. Assuming that the xy coordinates shown in FIGS. 10A to 10C are coordinates of two-dimensional captured images, the technique shown in FIG. 10A involves simply concatenating the image from the camera 1 and the image from the camera 2 in the x axis direction.

In contrast, the technique shown in FIG. 10B involves combining the image from the camera 1 and the image from the camera 2 while alternately weaving them along the x axis. To represent this in an equation, let the image from the camera 1 be $V\_1(x,y)$ and the image from the camera 2 be $V\_2(x,y)$. Letting $N(x,y)$ be the image resulting from the combining, $N(2*n,y)=V\_1(n,y)$, and $N(2*n+1,y)=V\_2(n,y)$. Note that n is the number of captured images.

Although combining by concatenating or weaving images in the x axis direction is performed in the examples shown in FIGS. 10A and 10B, combining in the y axis direction is possible, and combining in both the x axis direction and the y axis direction is possible. FIG. 10C shows an example in which there are four captured images, and combining is performed by weaving them in both the x axis direction and the y axis direction of one of the captured images.

Next, in S507 a feature vector (feature information) is created by extracting features from the combined image. For example, a feature vector is calculated from the image using an algorithm such as SIFT, which is disclosed in Non-patent Document 1, or HOG, which is disclosed in Non-patent Document 2. Note that in the case of performing simple image checking, the feature information is the pixel values of the combined image.

Non-patent Document 1: "Object recognition from local scale-invariant features", by D. G. Lowe, Proc. of IEEE International Conference on Computer Vision (ICCV), pp. 1150-1157, 1999.

Non-patent Document 2: "Histograms of oriented gradients for human detection", by N. Dalel and B. Triggs, Proc. of IEEE Conference on Computer Vision and Pattern Recognition (CVPR), pp. 886-893, 2005.

Next, in S508, estimation processing is performed for estimating the position and orientation of the target object by comparing the extracted target object feature information and the feature information indicated in the dictionary information. Specifically, a recognition result for each input image is acquired by performing matching between the dictionary and the feature vector. As a result, if the degree of reliability (degree of fitness) is greater than or equal to a predetermined threshold, the recognized type of the target object in the frame of interest and the orientation in which it exists are written in a result file.

Then in S509, the loop is repeated while moving the frame of interest, and the processing ends when all of the existence regions have been scanned. For example, as shown in FIGS. 4A to 4C, assume that the size of the existence range of the target object is 10 cm, 20 cm, and 15 cm in the x axis direction, the y axis direction, and the z axis direction respectively, and assume that the frame of interest is a cube with 5-cm edges. If the frame of interest is moved one cm at a time in the existence range of the target object, the loop for moving the frame of interest is executed 1,056 times (=6×16×11). In this way, the processing of S502 to S508 is executed on the frames of interest (on each partial space).

In the result file obtained by the matching in S508, it is possible to estimate the result with the highest degree of reliability (degree of fitness) to be the position and orientation of the target object. Specifically, the feature information pieces extracted for each partial space are each compared with the feature information indicated in the dictionary information, and the position and orientation of the target object can be estimated based on the set of partial images from which the feature information with the highest degree of fitness with the feature information indicated in the dictionary information was extracted.

As described above, with the configuration of the present embodiment, the position and orientation of a target object are estimated based on the features of a set made up of multiple partial images clipped from multiple captured images. For this reason, even in the case where self-occlusion occurs in some partial images, the position and orientation of the target object can be estimated stably and with high accuracy using the remaining partial images.

Also, with the configuration of the present embodiment, partial images are clipped from corresponding partial spaces, and for each partial space, feature information that indicates features of a set made up of multiple partial images corresponding to the clipped partial space are extracted. The position and orientation of the target object are then estimated based on the extracted information with the highest degree of fitness with the dictionary information. Accordingly, the configuration of the present embodiment enables accurately estimating the position and orientation of the target object regardless of where it is located in the target object existence range 401.

Note that the information processing apparatus may estimate the position in a partial space whose degree of fitness is greater than or equal to a predetermined threshold to be the position of the target object. Alternatively, in the case where the entire region occupied by the target object is represented in all of the partial images corresponding to a partial space, the position in that partial space can be estimated to be the position of the target object. According to such techniques, the position of the target object can be estimated simply and efficiently.

Also, the dictionary information may be provided for each type of object. In this case, comparing the extracted feature information and the feature information indicated in the dictionary information enables estimating not only the position and orientation of the target object, but also the type of object.

As described above, the configuration of the present embodiment has an effect of enabling estimating information such as the name of an object, its type, its three-dimensional position and orientation, and the like with high accuracy. In particular, in the case of using multiple captured images, there is an effect of enabling estimating the position and orientation of an object even if corresponding points cannot be found in principle due to self-occlusion or the like. Also, in the case of using multiple captured images, there is an effect of enabling estimating the position and orientation of an object with high accuracy by consistently processing each captured image.

Although it is assumed that a certain amount of distance separates a target object and the cameras in the embodiment described above, a description will now be given of a configuration of an embodiment in which the position and orientation of a target object can be detected with high accuracy even in the case where the target object and the cameras are close to each other.

Registered Image Group Acquisition

Figure 6:
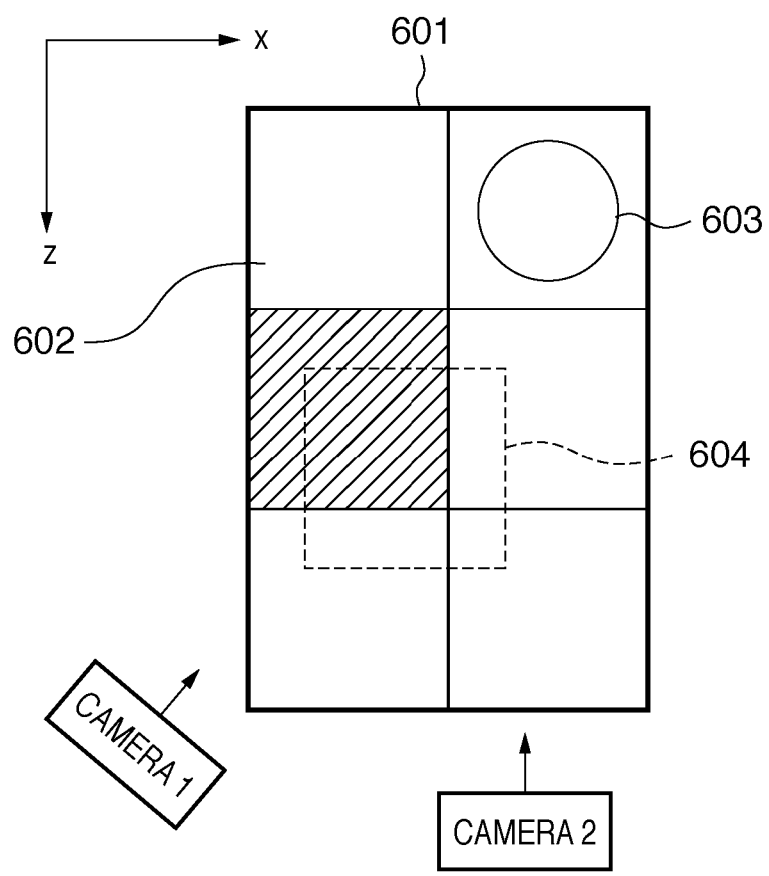
FIG. 6 is a diagram schematically showing positional relationships between a target object existence range and cameras.

The following describes a technique for acquiring a registered image group (registered captured image group) in the present embodiment with reference to FIG. 6. FIG. 6 is a diagram schematically showing positional relationships between the cameras and the target object existence range shown in FIG. 4C, as viewed from above (y axis positive direction). Reference numeral 601 denotes the existence region of the target object, which corresponds to 401 in FIGS. 4A to 4C. Reference numeral 604 denotes the frame of interest, which corresponds to 402 in FIGS. 4A to 4C.

In FIG. 6, the size of the target object existence region 601 indicated by being enclosed in a bold frame is 10 cm, 20 cm, and 15 cm in the x axis direction, the y axis direction, and the z axis direction respectively, similarly to the embodiment described above (401 in FIGS. 4A to 4C). In FIG. 6, reference numeral 603 denotes an example of the target object. The region of interest (frame of interest 604) is a cube with 5-cm edges, and has a square shape enclosed by the broken lines of 604 in FIG. 6. Likewise to the embodiment described above, the region of interest (frame of interest 604) is moved one centimeter at a time.

As shown in FIGS. 4A to 4C, no matter where the target object is located in the existence region in the embodiment described above, there is no change in the shape of the target object in the captured images. However, in the case where the existence range is close to the cameras as shown in FIG. 6, the apparent shape of the target object changes depending on where the object exists in the existence region. In order to successfully and accurately recognize the type, position, and orientation of the target object in such a case as well, multiple dictionaries (110) shown in FIG. 1 are held in the configuration of the present embodiment.

Specifically, existence region cells 602 are set in the target object existence region 601. In FIG. 6, the shape of each cell is a cube with 5-cm edges. Since the cells are tiled in the existence region 601 in FIG. 6, there are a total of 24 cells (=2×4×3). Note that although the cells 602 may be set so as to overlap each other, they are tiled in FIG. 6 to make the description easier to understand.

Whereas only one set of images of a target object, including variations in orientation, is used in registration in the embodiment described above, with the present embodiment it is necessary to provide, for example, 24 sets in the case of the situation shown in FIG. 6. Since the acquisition of registered images in the present embodiment requires a very large amount of effort, a more realistic implementation technique involves creating pseudo target object images using highly accurate computer graphics.

Processing Flow

Figure 7:
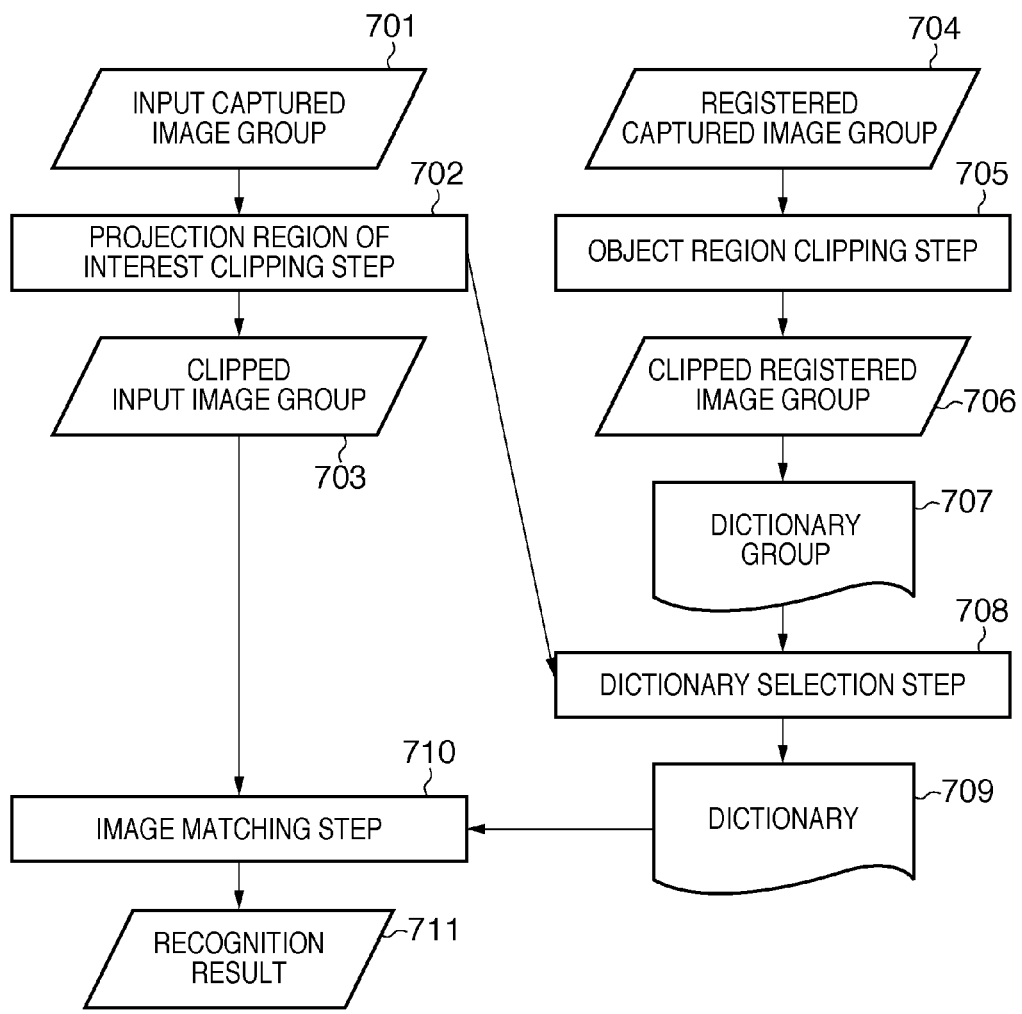
FIG. 7 is a processing flowchart illustrating a basic processing procedure of an object recognition technique.

FIG. 7 is a diagram showing a processing flow of the present embodiment. Reference numerals 701, 702, and 703 respectively correspond to 101, 102, and 103 in FIG. 1, and reference numerals 704, 705, and 706 respectively correspond to 106, 107, and 108 in FIG. 1. Descriptions of 701 to 706 have therefore been omitted. Although only one dictionary 110 is provided in FIG. 1, FIG. 7 differs from FIG. 1 in that reference numeral 707 denotes a dictionary group.

Reference numeral 708 denotes a dictionary selection step for selecting the dictionary in which image capturing was performed closest to the frame of interest used in the region of interest clipping step denoted by reference numeral 702. For example, in the case where the frame of interest exists at the location shown by the dashed lines in FIG. 6, the dictionary created using the image group captured in the cell indicated by diagonal lines is selected. Matching is then performed on the clipped input image group using the selected dictionary, and a recognition result is output.

Reference numerals 709, 710, and 711 respectively correspond to 110, 111, and 112 in FIG. 1. Descriptions of 709 to 711 have therefore been omitted. Note that although processing for normalizing (changing the size of) the captured image group after clipping is not shown in the processing flowchart of FIG. 7, normalization may of course be performed.

Figure 8:
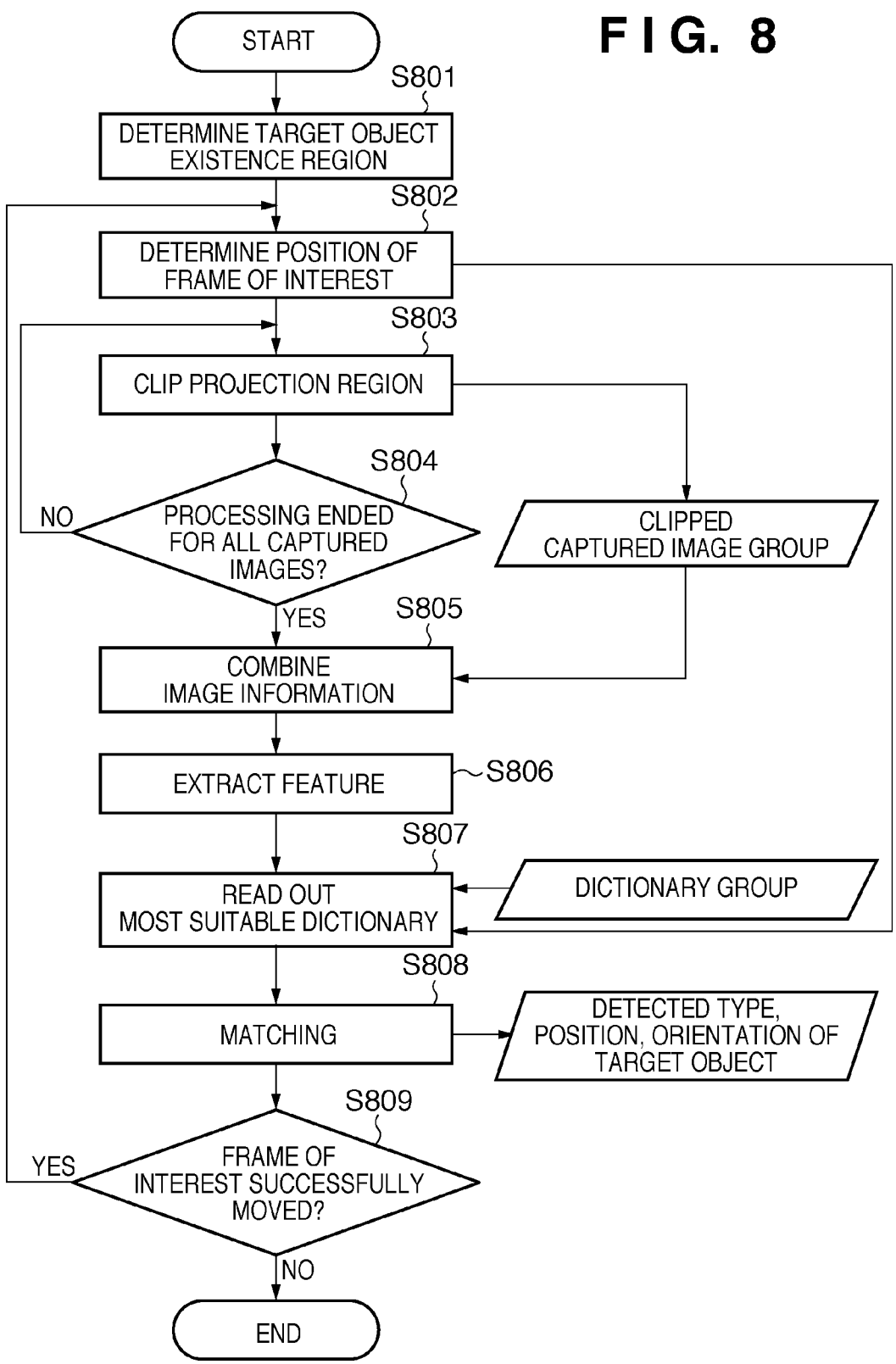
FIG. 8 is a flowchart showing a processing procedure executed by an information processing apparatus.

FIG. 8 is a flowchart showing a procedure for realizing the processing flow shown in FIG. 7. FIG. 8 shows basically the same flow as that shown in FIG. 5. Accordingly, only portions differing from the processing in FIG. 5 will be described. Note that, although a normalization procedure has been omitted from FIG. 8 in accordance with FIG. 7, the normalization procedure may be carried out as described above.

FIG. 8 differs from FIG. 5 in that the images in the clipped image group are combined (S805), features are extracted (S806), and thereafter an appropriate dictionary is read out from among the dictionaries in the dictionary group (S807). Here, the dictionary in which image capturing was performed closest to the current frame of interest is selected using the result of the frame of interest position determination step indicated by S802. This corresponds to the dictionary selection step 708 in the processing flow shown in FIG. 7.

As described above, in the present embodiment, the external storage apparatus 201 serving as a storage unit stores multiple pieces of dictionary information for each partial space as the dictionary group. Then, the information processing apparatus of the present embodiment estimates the position and orientation of the target object by, for each partial space, comparing each piece of feature information extracted from the partial space with the feature information indicated in the dictionary information corresponding to the partial space. Accordingly, the present embodiment enables accurately estimating the position and orientation of a target object since processing is performed using dictionary information that is most suitable according to the position of the target object.

Although the number of cameras and the number of captured images are assumed to be the same in the embodiment described above, multiple captured images are acquired and input by capturing multiple images with one camera in the present embodiment. Specifically, a camera is fixed onto a robot hand, and images of the target object are captured from different viewpoints by operating the robot hand.

For example, instead of acquiring three captured images with the three cameras shown in FIG. 3, three captured images are acquired while moving the one camera to the positions and directions of the three cameras shown in FIG. 3. Note that a configuration is possible in which, whereas the input image group (101) in FIG. 1 is acquired while moving the camera, the registered image group (106) is acquired using cameras that have been fixed in advance as shown in FIG. 3.

Figure 9:
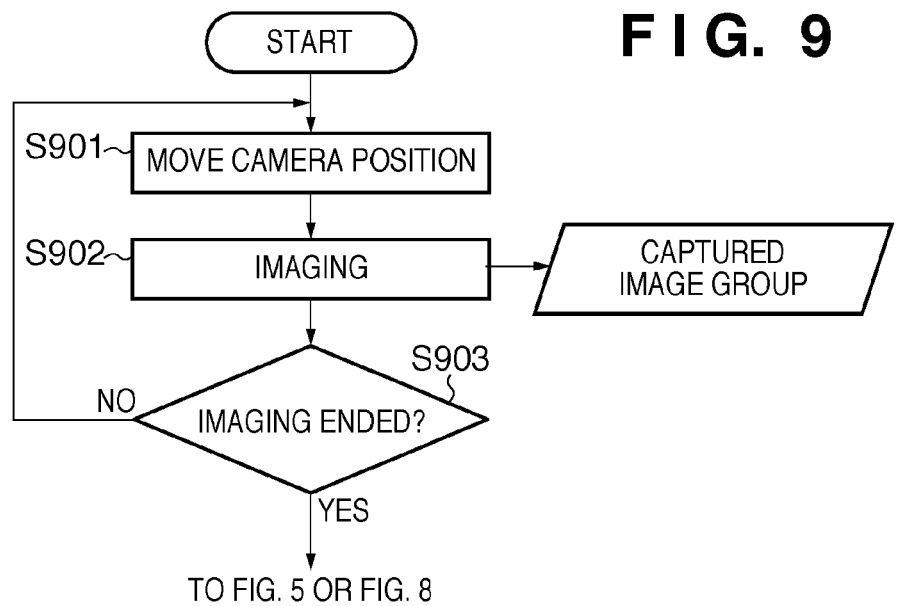
FIG. 9 is a flowchart showing a procedure for capturing multiple images.

FIG. 9 is a flowchart showing processing for realizing the present embodiment. The camera is moved to predetermined positions (S901), images are captured (S902), and captured image groups are successively stored. When image capturing has ended (S903), the processing of the flowchart shown in FIG. 5 or FIG. 8 is started.

In this way, according to the present embodiment, multiple images captured from multiple imaging positions by the same imaging apparatus are input as the captured images. For this reason, even if multiple imaging apparatuses are not provided, accurate position and orientation estimation can be performed similarly to the embodiment described above.

The present invention provides technology for stably and highly accurately estimating the position and orientation of a target object in a three-dimensional space using multiple captured images, even in an environment in which self-occlusion occurs.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-158263, filed on Jul. 12, 2010, which is hereby incorporated by reference herein in its entirety.

What is claimed is:

1. An information processing apparatus for estimating a position and orientation of a target object in a three-dimensional space, comprising:

an input unit configured to input a plurality of captured images obtained by imaging the target object from a plurality of viewpoints;

a setting unit configured to set a partial space in the three-dimensional space;

a changing unit configured to change a position of the partial space in the three-dimensional space;

a clipping unit configured to clip, for each of the input captured images, a partial image corresponding to the partial space in the three-dimensional space each time said changing unit changes the position of the partial space;

an extraction unit configured to extract, from each of the partial images clipped from the plurality of captured images, a feature information set indicating a feature of a set of the plurality of partial images each time said changing unit changes the position of the partial space;

a storage unit configured to store dictionary information indicating a position and orientation of an object in association with feature information of the object corresponding to the position and orientation; and an estimation unit configured to estimate the position and orientation of the target object by comparing each feature information set extracted by the extraction unit and the feature information indicated in the dictionary information.

2. The information processing apparatus according to claim 1, wherein the estimation unit compares each of the feature information sets extracted from the partial spaces with the feature information indicated in the dictionary information, and estimates the position and orientation of the target object based on degrees of fitness between the feature information sets and the feature information indicated in the dictionary information.

3. The information processing apparatus according to claim 2,
wherein the storage unit stores a dictionary information piece for each of the partial spaces, and
for each of the feature information sets extracted from the partial spaces, the estimation unit compares the feature information set with the feature information indicated in the dictionary information piece corresponding to the partial space, and estimates the position and orientation of the target object based on a set of partial images from which the feature information set having the highest degree of fitness with the feature information indicated in the dictionary information piece was extracted.

4. The information processing apparatus according to claim 2, wherein for each of the feature information sets extracted from the partial spaces, the estimation unit compares the feature information set with the feature information indicated in the dictionary information, and estimates the position and orientation of the target object based on a set of partial images from which the feature information set having the highest degree of fitness with the feature information indicated in the dictionary information was extracted.

5. The information processing apparatus according to claim 2, wherein the estimation unit estimates the position in a partial space whose degree of fitness is greater than or equal to a predetermined threshold to be the position of the target object.

6. The information processing apparatus according to claim 1, wherein in a case where the entire region occupied by the target object is represented in all of the partial images corresponding to a partial space, the estimation unit estimates the position in said partial space to be the position of the target object.

7. The information processing apparatus according to claim 1, wherein the extraction unit generates a single image by combining the plurality of partial images, and extracts information indicating a feature of the single image as the feature information.

8. The information processing apparatus according to claim 1,
wherein the storage unit stores a dictionary information piece for each type of object, and
the estimation unit estimates the type and the position and orientation of the target object by, for each of the extracted feature information sets, comparing the feature information set with the feature information indicated by the dictionary information pieces for each type of object.

9. The information processing apparatus according to claim 1, wherein a plurality of images captured by a plurality of imaging units that perform imaging from mutually different viewpoints are input by the input unit as the plurality of captured images.

10. The information processing apparatus according to claim 1, wherein a plurality of images captured from a plurality of viewpoints by a single imaging unit are input by the input unit as the plurality of captured images.

11. A method for controlling an information processing apparatus that comprises a storage unit configured to store dictionary information indicating a position and orientation of an object in association with feature information of the object corresponding to the position and orientation, and that is for estimating a position and orientation of a target object in a three-dimensional space, the method comprising the steps of:
inputting a plurality of captured images obtained by imaging the target object from a plurality of viewpoints;
setting a partial space in the three-dimensional space;
changing a position of the partial space in the three-dimensional space;
clipping, for each of the input captured images, a partial image corresponding to the partial space in the three-dimensional space each time the position of the partial space changes;
extracting, from each of the partial images clipped from the plurality of captured images, a feature information set indicating a feature of a set of the plurality of partial images each time the position of the partial space changes; and
estimating the position and orientation of the target object by comparing the feature information set extracted in the extraction step and the feature information indicated in the dictionary information.

12. A non-transitory computer-readable storage medium storing a program for causing a computer to function as the units included in the information processing apparatus according to claim 1.

* * * * *